July 15, 1969

S. H. RUTHERFORD 3,455,626

MOTION PICTURE PROJECTOR WITH SELECTIVE
CONTINUOUS OR INTERMITTENT DRIVE

Filed Jan. 17, 1966

United States Patent Office 3,455,626
Patented July 15, 1969

3,455,626
MOTION PICTURE PROJECTOR WITH SELECTIVE CONTINUOUS OR INTERMITTENT DRIVE
Stuart Henry Rutherford, Aylesbury, England, assignor to Redifon Air Trainers Limited, Aylesbury, England, a British company
Filed Jan. 17, 1966, Ser. No. 534,930
Claims priority, application Great Britain, Jan. 20, 1965, 2,551/65
Int. Cl. G03b 41/04
U.S. Cl. 352—119                           6 Claims

ABSTRACT OF THE DISCLOSURE

A motion picture projector has a rotating polygonal prism which provides optical rectification for the continuously moving film at high film speeds. Between the polygonal prism and the drive motor an escapement wheel is mounted on a drive shaft in which there is a resilient coupling. Two additional escapement wheels are mounted perpendicular to and adjacent the first-mentioned escapement wheel and are connected with the drive motor for continuous rotation. At high speed film projection the two continuously rotating escapement wheels are pivoted away from the first-mentioned escapement wheel which then moves continuously. However, at slower speeds the continuously moving wheels are pivoted to a position such that the notched peripheral surfaces of the three wheels intermesh such that periodically the first-mentioned wheel is advanced by the resilient coupling.

---

This invention relates to cine film projection or other viewing equipment having provision for varying, over a substantial range, the speed (i.e., the frame frequency) at which the film is running through it. An example of such equipment is the projector used in a variety of devices which produce visual displays for vehicle training or simulation devices in which the running speed is variable by the actions of a trainee vehicle driver to provide him with visual simulation of the travel of his vehicle through an external scene.

Such equipment may with advantage be designed to operate on a steady-motion principle, for example by using a rotating glass polygon to produce a visual "lap-dissolve" of each frame image into the next one as in some types of film editing device, which minimises wear on film and mechanism at high frame frequencies. However, use of this principle involves in practice a transient distortion of the projected picture during the optical changeover from one frame to the next; at conventional and higher running speeds this is not evident, but at low frame frequencies the rhythmic or pulsating distortion becomes obtrusive and, whilst of little consequence in film editing, can be unacceptable in projection or viewing devices for other purposes. The effect can be reduced by increasing the number of facets on the polygon-prism, but this will inherently reduce the effective aperture of the optical system and adversely affect picture brightness.

This dilemma is avoided by the present invention, according to which the equipment is of the steady or continuous-motion type but includes means for driving it, when operating at low speeds, in an intermittent or discontinuous mode in which a controllable-duration "dwell" for the projection of each frame is followed by shift or "pull down" to the next frame, this shift being executed in a uniformly brief interval so that the transient optical distortion referred to is not evident however low the frame frequency may be brought.

An example of a projector system in accordance with the invention is illustrated in the accompanying diagrammatic drawings, of which:

Figure 1:
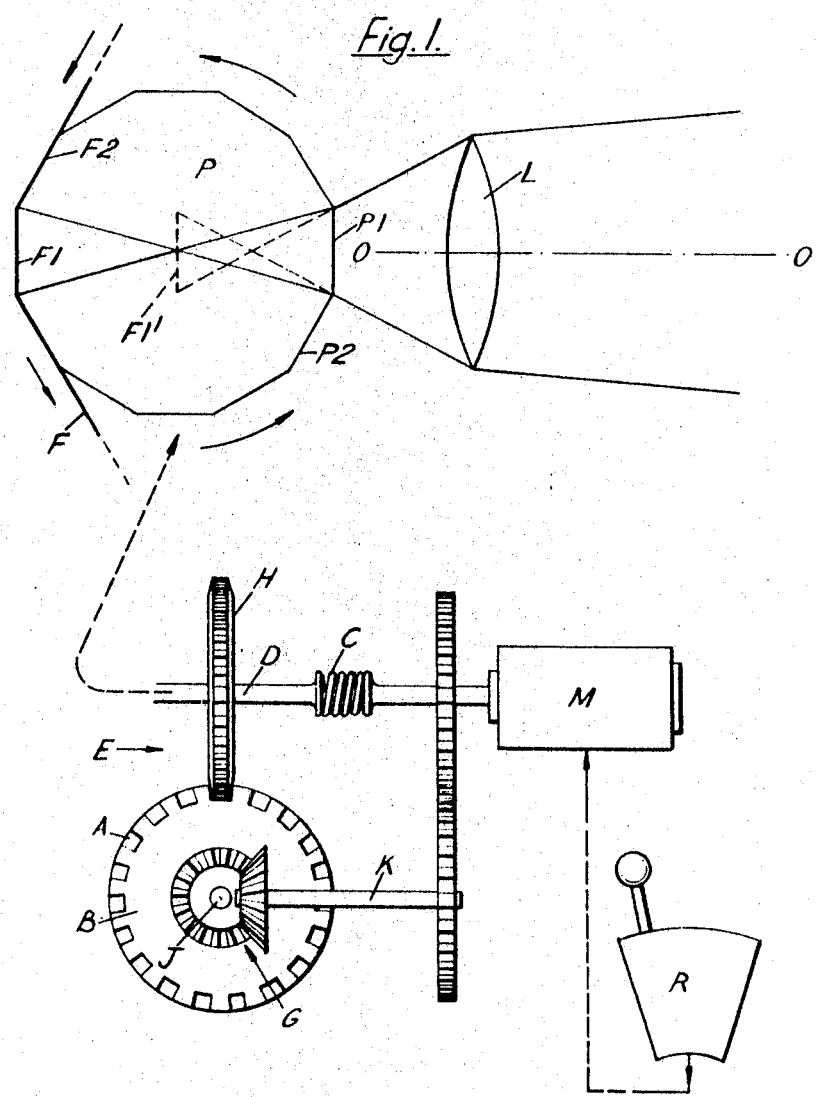
FIGURE 1 is a general side view showing the essential features of the system.

Referring to FIGURE 1, the projector includes a regular polygonal glass block P having an even number of faces—twelve in this example—rotating in the sense indicated by arrows. The film F is drawn down at one side of the polygon, being partially wrapped around the latter so as to be continuously in contact with three of its faces. The arrangement is such that each film frame corresponds to a polygon face: the polygon is made of the appropriate size for this purpose, and it will be understood that there would be positive means (such as film-driving sprocket teeth carried by the polygon itself) to maintain this registration between them. Where the film is in contact with the polygon, it is strongly illuminated from the left by a conventional projection lamp and condenser arrangement, whose details are not essential to appreciation of the present invention, and the projection lens system (indicated for the present purpose as a single lens L) is at the opposite side of the polygon.

Since the polygon in effect interposes between each film frame and the lens a parallel-sided block of glass, the lens will "see" each frame much nearer than it in fact is, and if the glass is of a high refractive index—of the order of 2—this vertical image of the frame will be substantially at the centre of the polygon. In FIGURE 1 this image of frame F1 is shown dotted at F1', and the marginal rays are shown of the light envelope which is consequently dealt with by the lens L.

Since the image F1' is at the polygon centre it will not be shifted off the optic axis O—O by rotation of the polygon, which will not therefore cause the image on the viewing screen to move vertically. However, polygon rotation away from the position shown in FIGURE 1 will mean that the virtual image F1' is seen by progressively less and less of the lens area as the polygon face P1 moves away upwards. The projected image of frame F1 on the viewing screen will accordingly become fainter and finally disappear when the polygon has made one-twelfth of a revolution. However, during this time more and more of the lens will see the virtual image of the next frame F2 as polygon face P2 moves up, and this frame will therefore appear on the screen and become progressively brighter.

This projector device accordingly produces on the viewing screen a picture which is uniformly bright and free from flicker, each frame being faded or "dissolved" into the next. In view of this, and of its steady-motion characteristic, it is very suitable for applications in which its frames-per-second running speed has to rise to maximum values. However, it is subject to a rhythmic distortion of the picture at each dissolve owing to the fact that the virtual images referred to do not stay perpendicular to the optic axis O—O but become slightly oblique to it at the beginning and end of each frame projection period. This effect is not noticeable except at low speeds: it can be reduced by increasing the number of faces on the polygon so that the latter turns through a smaller angle during the projection of each film frame, but this undesirably reduces the effective aperture or light-gathering capacity of the optical system and gives an unacceptably dim picture.

In accordance with this invention, the difficulty is dealt with by arranging for the system to change at the low end of its speed range to an intermittent-motion mode by the operation of an escapement device in its driving mechanism.

Referring again to FIGURE 1; the projector mechanism is driven by a motor M whose speed is remotely controlled by the operator of the system, for example a trainee vehicle driver having a manual speed regulator R. Provision for this drive and variable-speed control may readily be made in a wide variety of ways and is accordingly indicated simply by dotted lines in FIGURE 1.

Interposed in the mechanical drive between the motor M and the polygon is a coupling C so constructed as to yield resiliently when stressed above a predetermined threshold value. Such a coupling can readily be designed, for example by incorporating pre-stressed spring means, and allows the motion of the projector to be made intermittent by the escapement mechanism E although the motor M is running continuously at the speed determined by its regulator R.

Figure 2:
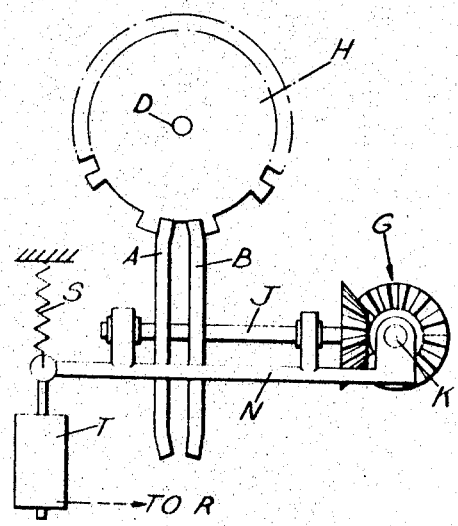
FIGURE 2 is an end view of the escapement mechanism included in FIGURE 1.
Figure 3:
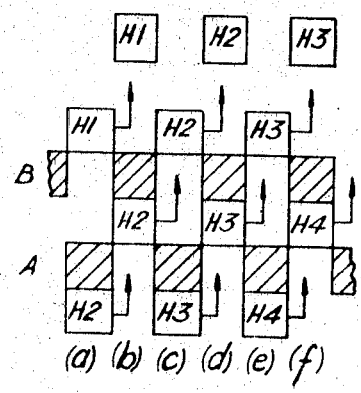
FIGURE 3 is a diagram showing in a flat developed view the manner in which the teeth of the escapement gear wheels co-operate to govern the discontinuous mode of the projector.

The escapement mechanism comprises a toothed wheel H on a shaft D in the driving connection between the coupling C and the projector, and two toothed wheels A and B spaced slightly apart on a layshaft J driven directly (i.e., continuously) from the motor M through bevel gearing G, so that shafts D and J are at right angles to each other. Wheels A and B are similar to each other but, as indicated in FIGURE 2, they have a mutual angular displacement so that the teeth of one are opposite the spaces of the other, and each tooth of wheel H is arrested twice in passing transversely through A, B. This action is illustrated in the diagram FIGURE 3, in which it is supposed that the teeth rows of A and B (shown shaded) are moving steadily to the left and the teeth H are being urged in the upwards direction, via the resilient coupling previously referred to. For clarity of illustration, FIGURE 3 shows wheel H also displaced successively to the right, rather than A and B moving to the left.

At the stage marked a it may be supposed that a tooth H1 of wheel H has just passed through the escapement, and the next tooth H2 is abutting against a tooth of wheel A. This will hold the projector polygon stationary, giving a "dwell" for the projection of a film frame which will last until the escapement has moved sufficiently for H2 to be wholly opposite the gap between this A tooth and the next. It will now be snapped through this gap by the accumulated stress in the drive coupling C and be stopped by a tooth of wheel B, shown at stage b of FIGURE 3. After further movement of the escapement by the same amount, H2 will escape through the next gap between teeth of wheel B, and its succeeding tooth H3 will be stopped by the outer face of a tooth in wheel A. This is shown as stage c, the parts having in fact reverted to the relationship of stage a, and this action continues through stages d, e, f . . . these correspondingly alternately to stages b and a. It will of course be understood that the shaping and disposition of A, B and H and their teeth are such as a minimise any play in the mechanism and to ensure that H moves by uniform steps, each of which advances the projector mechanism by exactly one film frame, i.e., one twelfth of a revolution of the polygon P. It will also be evident that this escapement mechanism provides a "dwell" at each stage whose duration is dependent on the speed at which motor M is running, and that the intervening shifts are uniformly rapid even at the slowest motor speeds.

The changeover from intermittent to continuous motion of the projector is in this example of the invention effected by disengaging the escapement wheels A and B from wheel H. For this purpose, layshaft J may be carried in a bracket N (FIGURE 2) pivoted about the input shaft K of the bevel gear G and swung away (against a return spring S) by a solenoid T energised from the driver's control R at the appropriate speed setting. In one contemplated application of the invention, the system is designed to operate at a maximum frame frequency, in the continuous motion mode, of 120 per second for visual simulation of railway locomotive travel at 90 m.p.h.; when speed falls below about 20 frames per second (15 m.p.h.) changeover to the intermittent mode takes place. Coupled to and operating with this mechanism there may also be a "zoom" lens in the projector optics to minimise the jerky motion effect at low frame frequencies by use of the technique described in our co-pending application Ser. No. 452,293 filed Apr. 30, 1965, now Patent No. 3,389,954, granted June 25, 1968.

I claim:

1. Motion picture projection apparatus, comprising, in combination: a projection lens system; movable optical means for imaging successive frames of a continuously moving motion picture film to be viewed by said projection lens system; variable speed film feed means for advancing said film in synchronism with said movable optical means to present said successive frames to said optical means; and means responsive to a variable input signal for driving said movable optical means and said film feed means continuously over a first speed range and intermittently over a second speed range.

2. Apparatus according to claim 1 in which said movable optical means comprises a rotary polygon prism for producing a visual lap-dissolve of each of said frames into a succeeding frame.

3. Apparatus according to claim 1 in which said means for driving said movable optical means and said film feed means includes variable speed motor means, and a resilient coupling and an escapement driven by said motor means for driving said movable optical means and said film feed means intermittently over said second speed range.

4. Apparatus according to claim 1 in which said means for driving said movable optical means and said film feed means includes variable speed motor means responsive to said variable input signal and operative to drive said movable optical means and said film feed means continuously over said first speed range at speeds which vary in accordance with said input signal, an escapement mechanism operable upon engagement to cause said variable speed motor means to drive said movable optical means and said film feed means intermittently, and means responsive to said input signal for controlling engagement of said escapement mechanism.

5. Apparatus according to claim 3 in which said motor means is connected to drive said movable optical means and said film feed means through said resilient coupling over said first speed range, said resilient coupling including an input portion connected to said motor means, an output portion connected to said movable optical means and said film feed means and resilient means interconnecting said input and output portions; said apparatus including means operative over said second speed range for connecting said escapement to said output portion of said coupling, thereby to cause said output portion of said coupling, said movable optical means and said film feed means to be advanced intermittently over said second speed range.

6. Apparatus according to claim 3 in which said escapement includes a first toothed wheel driven by said motor means through said resilient coupling, and second toothed wheel means driven directly by said motor means.

References Cited

UNITED STATES PATENTS

| | | | |
|---|---|---|---|
| 1,104,873 | 7/1914 | Butcher | 352—181 |
| 2,091,705 | 8/1937 | Farnsworth | 352—120 X |
| 2,143,145 | 1/1939 | Farnsworth | 352—120 |
| 2,373,313 | 4/1945 | Jeandron | 352—131 X |
| 2,461,718 | 2/1949 | Bruno | 352—119 |

NORTON ANSHER, Primary Examiner

MONROE H. HAYES, Assistant Examiner

U.S. Cl. X.R.

352—181